US009982152B2

(12) United States Patent
Yamada (10) Patent No.: US 9,982,152 B2
(45) Date of Patent: May 29, 2018

(54) ACTIVE ENERGY RAY CURABLE COMPOSITION, CURED PRODUCT, COMPOSITION STORAGE CONTAINER, TWO-DIMENSIONAL OR THREE-DIMENSIONAL IMAGE FORMING APPARATUS, AND TWO-DIMENSIONAL OR THREE-DIMENSIONAL IMAGE FORMING METHOD

(71) Applicant: Hiroaki Yamada, Chiba (JP)

(72) Inventor: Hiroaki Yamada, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 0 days. days.

(21) Appl. No.: 15/485,653

(22) Filed: Apr. 12, 2017

(65) Prior Publication Data

US 2017/0327705 A1    Nov. 16, 2017

(30) Foreign Application Priority Data

May 13, 2016 (JP) ................... 2016-096982
Mar. 9, 2017 (JP) ................... 2017-045097

(51) Int. Cl.
*B41J 11/00* (2006.01)
*C08F 2/48* (2006.01)
(Continued)

(52) U.S. Cl.
CPC ........... *C09D 11/107* (2013.01); *B41J 11/002* (2013.01); *C08F 2/48* (2013.01); *C08F 22/14* (2013.01);
(Continued)

(58) Field of Classification Search
CPC . B41J 11/002; C08F 2/48; C08F 22/14; C08F 26/06; C09D 11/101; C09D 11/107; C09D 11/30
See application file for complete search history.

(56) References Cited

U.S. PATENT DOCUMENTS 7,244,473 B2 * 7/2007 Takabayashi ......... C07C 381/12
427/466
8,399,541 B2 * 3/2013 Suwa ..................... C09C 1/56
522/184
(Continued)

FOREIGN PATENT DOCUMENTS

EP    2 133 744 A1    12/2009
EP    2 975 091 A1    1/2016
(Continued)

OTHER PUBLICATIONS

Extended European Search Report dated Oct. 12, 2017 in Patent Application No. 17165878.4.
(Continued)

*Primary Examiner* — Anh T. N. Vo
(74) *Attorney, Agent, or Firm* — Oblon, McClelland, Maier & Neustadt, L.L.P.

(57) ABSTRACT

An active energy ray curable composition is provided. The active energy ray curable composition includes a polymerizable monomer (A) and a polymerization initiator (B). The polymerization initiator (B) includes a skin-sensitizing polymerization initiator (B1) in an amount less than 1.0% by mass but not less than 0.1% by mass of the active energy ray curable composition, and 99.0% by mass or more of the active energy ray curable composition consists of non-skin-sensitizing constituents.

9 Claims, 3 Drawing Sheets

(51) Int. Cl.
*C09D 11/101* (2014.01)
*C09D 11/107* (2014.01)
*C08F 22/14* (2006.01)
*C08F 26/06* (2006.01)
*C09D 11/30* (2014.01)

(52) U.S. Cl.
CPC ............ *C08F 26/06* (2013.01); *C09D 11/101* (2013.01); *C09D 11/30* (2013.01)

(56) References Cited

U.S. PATENT DOCUMENTS

| | | | |
|---|---|---|---|
| 9,051,481 B2* | 6/2015 | Yoshino | C09D 11/101 |
| 9,303,173 B2* | 4/2016 | Yoshino | C09D 11/101 |
| 9,663,603 B2* | 5/2017 | Noda | C08F 220/14 |
| 2010/0104827 A1 | 4/2010 | Yorisue | |
| 2012/0147103 A1 | 6/2012 | Hasegawa et al. | |
| 2013/0210957 A1 | 8/2013 | Takihara et al. | |
| 2014/0240414 A1 | 8/2014 | Hiraoka | |
| 2014/0327719 A1 | 11/2014 | Hiraoka | |
| 2015/0099819 A1 | 4/2015 | Hiraoka | |
| 2015/0369984 A1 | 12/2015 | Johnson et al. | |
| 2016/0017159 A1 | 1/2016 | Kaneko et al. | |
| 2016/0257818 A1 | 9/2016 | Mezaki et al. | |
| 2016/0297912 A1 | 10/2016 | Hiraoka | |
| 2016/0319140 A1 | 11/2016 | Hiraoka | |
| 2016/0369116 A1 | 12/2016 | Iio et al. | |
| 2017/0008325 A1 | 1/2017 | Hiraoka et al. | |
| 2017/0022378 A1 | 1/2017 | Iio et al. | |

FOREIGN PATENT DOCUMENTS

| | | |
|---|---|---|
| JP | 2012-140593 | 7/2012 |
| JP | 2012-251123 | 12/2012 |
| JP | 2012-255137 | 12/2012 |
| JP | 2013-007021 | 1/2013 |
| JP | 2013-095910 | 5/2013 |
| JP | 2015-086396 | 5/2015 |
| WO | WO 2017/073522 A1 | 5/2017 |

OTHER PUBLICATIONS

H. B. van der Walle, et al., "Sensitizing potential of 14 mono (meth) acrylates in the guinea pig*" Contact Dermatitis 1982: 8: 223-235.

* cited by examiner

ACTIVE ENERGY RAY CURABLE COMPOSITION, CURED PRODUCT, COMPOSITION STORAGE CONTAINER, TWO-DIMENSIONAL OR THREE-DIMENSIONAL IMAGE FORMING APPARATUS, AND TWO-DIMENSIONAL OR THREE-DIMENSIONAL IMAGE FORMING METHOD

CROSS-REFERENCE TO RELATED APPLICATIONS

This patent application is based on and claims priority pursuant to 35 U.S.C. § 119(a) to Japanese Patent Application Nos. 2016-096982 and 2017-045097, filed on May 13, 2016 and Mar. 9, 2017, respectively, in the Japan Patent Office, the entire disclosure of each of which is hereby incorporated by reference herein.

BACKGROUND

Technical Field

The present disclosure relates to an active energy ray curable composition, a cured product, a composition storage container, a two-dimensional or three-dimensional image forming apparatus, and a two-dimensional or three-dimensional image forming method.

Description of the Related Art

In active energy ray curable inkjet recording, radical polymerizable inks and cationic polymerizable inks are used. Radical polymerizable inks are more widely used from the aspect of production cost and storage stability.

One example of active energy ray curable radical polymerizable inks includes a composition including a polymerizable monomer (e.g., an acrylate) as a main ingredient and a polymerization initiator that generates radicals upon emission of an active energy ray.

However, a lot of types of acrylates and polymerization initiators have skin sensitization potential. If an ink including such skin-sensitizing substances is attached to the skin by mistake, an allergic reaction may be caused.

SUMMARY

In accordance with some embodiments of the present invention, an active energy ray curable composition is provided. The active energy ray curable composition includes a polymerizable monomer (A) and a polymerization initiator (B). The polymerization initiator (B) includes a skin-sensitizing polymerization initiator (B1) in an amount less than 1.0% by mass but not less than 0.1% by mass of the active energy ray curable composition, and 99.0% by mass or more of the active energy ray curable composition consists of non-skin-sensitizing constituents.

In accordance with some embodiments of the present invention, a cured product is provided. The cured product is produced by causing the above active energy ray curable composition to cure.

In accordance with some embodiments of the present invention, a composition storage container is provided. The composition storage container includes a container and the above active energy ray curable composition contained in the container.

In accordance with some embodiments of the present invention, a two-dimensional or three-dimensional image forming apparatus is provided. The two-dimensional or three-dimensional image forming apparatus includes the above composition storage container, a discharger, and an emitter. The discharger is configured to discharge the active energy ray curable composition contained in the container. The emitter is configured to emit an active energy ray to the discharged active energy ray curable composition.

In accordance with some embodiments of the present invention, a two-dimensional or three-dimensional image forming method is provided. The two-dimensional or three-dimensional image forming method includes discharging the above active energy ray composition and emitting an active energy ray to the discharged active energy ray composition.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

In accordance with some embodiments of the present invention, an active energy ray curable composition is provided that has no skin sensitization potential and is curable with a small amount of energy.

An active energy ray curable composition according to an embodiment of the present invention includes a polymerizable monomer (A) and a polymerization initiator (B) including a skin-sensitizing polymerization initiator (B1) in an amount less than 1.0% by mass but not less than 0.1% by mass of the active energy ray curable composition, and 99.0% by mass or more of the active energy ray curable composition consists of non-skin-sensitizing constituents.

In the present disclosure, compounds having skin sensitization potential refer to those determined to be positive in a skin sensitization test. Hereinafter, such compounds may also be referred to as "skin-sensitizing compounds" or "skin sensitizers". The skin sensitization test is not limited to a specific test. As an example of the skin sensitization test, LLNA (Local Lymph Node Assay) is known that evaluates the degree of sensitization potential by SI (Stimulus Index). SI of 3 or more is determined to be positive.

By contrast, compounds having no skin sensitization potential refer to those determined to be negative in a skin sensitization test. Hereinafter, such compounds may also be referred to as "non-skin-sensitizing compounds".

All compounds can be categorized into skin-sensitizing compounds or non-skin-sensitizing compounds through a skin sensitization test. Even in a case in which the skin sensitization potential of a compound is unknown, because of the lack of data, the compound actually falls into the group of skin-sensitizing compounds or that of non-skin-sensitizing compounds.

So long as the active energy ray curable composition includes non-skin-sensitizing components in an amount of 99.0% by mass or more of the active energy ray curable composition, the skin sensitization potential of minor components can remain unknown.

The skin sensitization potential data of commercial products are available from a safety data sheet (SDS) attached to each product. In particular, SDSs complied with Globally Harmonized System of Classification and Labelling of Chemicals (GHS) are preferred. Such SDSs report that skin-sensitizing compounds are classified in category 1, more specifically, in sub-category 1A (strong skin sensitizers) or sub-category 1B (other skin sensitizers), of the hazard category for skin sensitizers according to GHS. Even being not complied with GHS, SDSs may provide information on whether a compound is positive or negative in a skin sensitization test, or whether a compound has skin sensitization potential or not based on the result of a skin sensitization test.

In addition, information on the skin sensitization potential of compounds are available in published documents, such as Van Der Walle, H. B. et al., "Sensitizing potential of 14 mono (meth) acrylates in the guinea pig", *Contact Dermatitis*, vol. 8, pp. 223-235 (1982), the disclosure thereof being incorporated herein by reference.

The polymerization initiator (B) includes a skin-sensitizing polymerization initiator (B1). Both skin-sensitizing polymerization initiators and non-skin-sensitizing polymerization initiators are known. Generally, skin-sensitizing polymerization initiators have higher ability for initiating a polymerization, which is advantageous in improving curability.

The content rate of the skin-sensitizing polymerization initiator (B1) in the active energy ray curable composition is less than 1.0% by mass but not less than 0.1% by mass. When the content rate is 0.01% by mass or more, the skin-sensitizing polymerization initiator (B1) can sufficiently exert its function. When the content rate is 1.0% by mass or less, the active energy ray curable composition is free from risk of sensitizing skin.

Preferably, the skin-sensitizing polymerization initiator (B1) is selected from compounds not classified in sub-category 1A of the hazard category for skin sensitizers according to GHS. In other words, preferably, the skin-sensitizing polymerization initiator (B1) is selected from compounds classified in category 1 or sub-category 1B. More preferably, the skin-sensitizing polymerization initiator (B1) is selected from compounds classified in category 1B.

More specifically, preferably, the skin-sensitizing polymerization initiator (B1) is selected from acylphosphine oxide compounds or oxime ester compounds. Specific examples of such compounds are listed below, but are not limited thereto.

Polymerization Initiator (B1)

Acylphosphine Oxide Compounds
- Diphenyl(2,4,6-trimethylbenzoyl)phosphine oxide (IRGACURE TPO available from BASF Japan Ltd., classified in sub-category 1B for skin sensitizers (according to SDS))
- Phenylbis(2,4,6-trimethylbenzoyl)phosphine oxide (IRGACURE 819 available from BASF Japan Ltd., classified in category 1 for skin sensitizers (according to SDS))

Oxime Ester Compounds
- 1-[4-(Phenylthio)phenyl]octane-1,2-dione 2-(O-benzoyloxime) (IRGACURE OXE01 available from BASF Japan Ltd., classified in category 1 for skin sensitizers (according to SDS))
- 1-[9-Ethyl-6-(2-methylbenzoyl)-9H-carbazole-3-yl] ethanone O-acetyloxime (IRGACURE OXE02 available from BASF Japan Ltd., classified in sub-category 1B for skin sensitizers (according to SDS))

Each of these compounds can be used alone or in combination with others.

The polymerization initiator (B) may further include a non-skin-sensitizing polymerization initiator (B2) in an amount of from 1.0% to 20.0% by mass of the active energy ray curable composition. The non-skin-sensitizing polymerization initiator (B2) has a moderate ability for initiating a polymerization, and is used for the purpose of supplementing the function of the skin-sensitizing polymerization initiator (B1).

Preferably, the non-skin-sensitizing polymerization initiator (B2) is selected from α-aminoketone compounds or α-hydroxyketone compounds. Specific examples of such compounds are listed below, but are not limited thereto.

Polymerization Initiator (B2)

α-Aminoketone Compounds
- 2-Methyl-1-[4-(methylthio)phenyl]-2-morpholinopropane-1-one (IRGACURE 907 available from BASF Japan Ltd., negative in a skin sensitization test (according to SDS))
- 2-(Dimethylamino)-2-[(4-methylphenyl)methyl]-1-(4-morpholinophenyl)butane-1-one (IRGACURE 379 available from BASF Japan Ltd., negative in a skin sensitization test (according to SDS))

α-Hydroxyketone Compounds
- 1-Hydroxycyclohexyl phenyl ketone (IRGACURE 184 available from BASF Japan Ltd., negative in a skin sensitization test (according to SDS))
- 1-[4-(2-hydroxyethoxy)phenyl]-2-hydroxy-2-methylpropane-1-one (IRGACURE 2959 available from BASF Japan Ltd., negative in a skin sensitization test (according to SDS))

Each of these compounds can be used alone or in combination with others.

Polymerizable Monomer (A)

The polymerizable monomer (A) is a compound having at least one polymerizable reactive group and no skin sensitization potential.

Specific examples of the polymerizable reactive group include, but are not limited to, groups having a polymerizable unsaturated bond, such as acryloyl group, methacryloyl group, acrylamide group, methacrylamide group, vinyl group, vinyloxy group, and allyl group. Specific examples of the polymerizable monomer (A) include, but are not limited to, methacrylate-based radical polymerizable monomers, such as γ-butyrolactone methacrylate, tricyclodecane dimethanol dimethacrylate, polyethylene glycol (400) dimethacrylate, polyethylene glycol (600) dimethacrylate, trimethylolpropane trimethacrylate, EO/PO-modified trimethylolpropane trimethacrylate, (2-methyl-2-isobutyl-1,3-dioxolan-4-yl) methacrylate, trifluoroethyl methacrylate, neopentyl glycol dimethacrylate, caprolactone-modified 2-(methacryloyloxy)ethyl phosphate, phenoxyethyl methacrylate, glycerin dimethacrylate, methoxydiethylene glycol methacrylate, methoxytetraethylene glycol methacrylate, EO/PO-modified phosphoric acid methacrylate, diethylene glycol dimethacrylate, dicyclopentenyloxyethyl methacrylate, dicyclopentanyl methacrylate, 1,4-butanediol dimethacrylate, 1,6-hexanediol dimethacrylate, ethylene glycol dimethacrylate, tetraethylene glycol dimethacrylate, 2-hydroxy-1,3-dimethacryloxypropane, neopentyl glycol dimethacrylate, EO/PO-modified bisphenol A methacrylate, EO/PO-modified phosphate dimethacrylate, polyethylene glycol (200) dimethacrylate, polytetramethylene glycol dimethacrylate, trimethylolpropane methacrylic acid benzoate, polyethylene glycol (1000) dimethacrylate, dipropylene glycol dimethacrylate, tripropylene glycol dimethacrylate, polypropylene glycol (400) dimethacrylate, polypropylene glycol (700) dimethacrylate, EO/PO-modified bisphenol A dimethacrylate, EO/PO-modified 1,6-hexanediol dimethacrylate, dipentaerythritol hexamethacrylate, EO/PO-modified tetramethylolmethane tetramethacrylate, caprolactone-modified dipentaerythritol hexamethacrylate, dipentaerythritol hydroxypentamethacrylate, caprolactone-modified dipentaerythritol hydroxypentamethacrylate, ditrimethylolpropane tetramethacrylate, pentaerythritol tetramethacrylate, pentaerythritol trimethacrylate, tris(2-hydroxyethyl) isocyanurate trimethacrylate, EO/PO-modified neopentyl glycol dimethacrylate, propoxylated neopentyl glycol dimethacrylate, propoxylated glyceryl trimethacrylate, polyester dimethacrylate, polyester trimethacrylate, polyester tetramethacrylate, polyester pentamethacrylate, polyester hexamethacrylate, polyurethane dimethacrylate, polyurethane trimethacrylate, polyurethane tetramethacrylate, polyurethane pentamethacrylate, polyurethane hexamethacrylate, 1,3-butylene glycol dimethacrylate, 2-ethylhexyl methacrylate, 2-hydroxy-3-acryloyloxypropyl methacrylate, 2-hydroxy-3-methacryloxypropyl trimethyl ammonium chloride, 2-hydroxybutyl methacrylate, 2-hydroxyethyl methacrylate, alkyl methacrylate, allyl methacrylate, benzyl methacrylate, butoxyethyl methacrylate, butyl methacrylate, cetyl methacrylate, cyclohexyl methacrylate, diethylaminoethyl methacrylate, dimethylaminoethyl methacrylate, ethyl methacrylate, glycerol polymethacrylate, glycidyl methacrylate, hexafluoropropyl methacrylate, isobornyl methacrylate, isobutyl methacrylate, isodecyl methacrylate, lauroxy polyethylene glycol methacrylate, lauryl methacrylate, methoxy polyethylene glycol methacrylate, nonylphenoxy poly(ethylene glycol-propylene glycol) methacrylate, nonylphenoxy polyethylene glycol methacrylate, nonylphenoxy polypropylene glycol methacrylate, octafluoropentyl methacrylate, octoxy polyethylene glycol-propylene glycol methacrylate, pentamethyl piperidyl methacrylate, perfluorooctyl ethyl methacrylate, EO/PO-modified phthalic acid methacrylate, EO/PO-modified phthalic acid dimethacrylate, polyethylene glycol-polypropylene glycol methacrylate, poly(ethylene glycol-tetramethylene glycol) methacrylate, polypropylene glycol-tetramethylene glycol) methacrylate, polyethylene glycol methacrylate, polypropylene glycol methacrylate, sodium 2-sulfoethylmetharylate, stearoxy polyethylene glycol methacrylate, stearyl methacrylate, isostearyl methacrylate, EO/PO-modified succinic acid methacrylate, t-butyl cyclohexyl methacrylate, t-butyl methacrylate, n-pentyl methacrylate, n-hexyl methacrylate, tetrafluoropropyl methacrylate, tetrahydrofurfuryl methacrylate, tetramethyl piperidyl methacrylate, tribromophenyl methacrylate, tridecyl methacrylate, behenyl methacrylate, γ-methacryloxy trimethoxysilane, polyethylene glycol dimethacrylate, 2-(2-vinyloxyethoxyethyl) methacrylate, 2-methyl-2-adamantyl methacrylate, 2-ethyl-2-adamantyl methacrylate, 1,9-nonanediol dimethacrylate, 1,10-decanediol dimethacrylate, allyloxy polyethylene glycol methacrylate, EO/PO-modified bisphenol A dimethacrylate, PO/tetramethylene oxide-modified bisphenol A dimethacrylate, ECH-modified glycerol dimethacrylate, ECH-modified phenoxy dimethacrylate, polytetramethylene glycol dimethacrylate, polyethylene glycol dimethacrylate, ECH-modified polyethylene glycol methacrylate, ECH-modified polyethylene glycol dimethacrylate, EO/PO-modified bisphenol A diglycidyl ether dimethacrylate, triethylene glycol dimethacrylate, EO-modified tetrabromobisphenol A dimethacrylate, EO/PO-modified polypropylene glycol dimethacrylate, HPA-modified trimethylolpropane dimethacrylate, and HPA-modified trimethylolpropane trimethacrylate.

Each of these monomers can be used alone or in combination with others.

Among the above methacrylate monomers, the following monomers have an SI value equal to 3 or less: polyfunctional monomers such as tricyclodecane dimethanol dimethacrylate and polyethylene glycol dimethacrylates represented by the following formula (1) where n ranges from 9 to 14 (e.g., polyethylene glycol (400) dimethacrylate (n=9), polyethylene glycol (600) dimethacrylate (n=14), trimethylolpropane trimethacrylate, and neopentyl glycol dimethacrylate; and monofunctional monomers such as γ-butyrolactone methacrylate, t-butyl methacrylate, n-pentyl methacrylate, and n-hexyl methacrylate.

Formula (1)

Preferably, to achieve a good balance between skin sensitization and curability, at least one of the following polyfunctional monomers is used: tricyclodecane dimethanol dimethacrylate, polyethylene glycol (400) dimethacrylate, polyethylene glycol (600) dimethacrylate, and trimethylolpropane trimethacrylate.

Such polyfunctional monomers may be used in combination with the following monofunctional monomers: γ-butyrolactone methacrylate, t-butyl methacrylate, n-pentyl methacrylate, and n-hexyl methacrylate.

Which compound to select is determined depending on desired viscosity and curability of the active energy ray curable composition and various properties (e.g., hardness, adhesion, optical properties) of the resulting cured film. The polymerizable monomer (A) is not limited in the number of polymerizable reactive groups (i.e., the number of functional groups) and in molecular weight. Examples of the polymerizable monomer (A) include oligomers and macromonomers.

Preferably, the polymerizable monomer (A) includes a non-skin-sensitizing monofunctional acrylamide compound.

Specific examples of the non-skin-sensitizing monofunctional acrylamide compound are listed below, but are not limited thereto.

Acryloylmorpholine (ACMO available from KJ Chemicals Corporation, negative in a skin sensitization test (according to SDS))

N-(2-Hydroxyethyl)acrylamide (HEAA available from KJ Chemicals Corporation, negative in a skin sensitization test (according to SDS))

The monofunctional acrylamide compound has excellent curability and provides a cured product having high degrees of hardness and adhesion.

Specific examples of the polymerizable monomer (A) further include non-skin-sensitizing polyfunctional acrylates and methacrylates, such as tricyclodecane dimethanol dimethacrylate (difunctional), neopentyl glycol dimethacrylate (difunctional), and caprolactone-modified dipentaerythritol hexaacrylate (hexafunctional).

The active energy ray curable composition may optionally include other components, if necessary.

Active Energy Ray

Specific examples of active energy ray for causing the active energy ray curable composition to cure include, but are not limited to, ultraviolet ray, electron beam, α-ray, β-ray, γ-ray, and X-ray, each of which is capable of giving energy to polymerizable compounds included in the active energy ray curable composition to cause a polymerization reaction. In a case in which the active energy ray is emitted from a high-energy light source, the polymerizable compound can undergo a polymerization reaction without a polymerization initiator. In the case of ultraviolet ray emission, a GaN-based semiconductor ultraviolet light emitting device is preferably used as the light source from both industrial and environmental aspects. In particular, mercury-free light sources are strongly demanded in accordance with the increasing momentum of environment preservation. In addition, ultraviolet light emitting diode (UV-LED) and ultraviolet light laser diode (UV-LD) are preferable since they are advantageous in terms of their compact size, extended lifespan, high efficiency, and low cost.

Colorant

The active energy ray curable composition may further include a colorant. Examples of the colorant include pigments and dyes with various colors such as black, white, magenta, cyan, yellow, green, and orange, or metallic colors such as gold and silver. Which colorant to select is determined depending on the purpose of use and demand characteristics of the composition. Preferably, the content rate of the colorant in the composition is in the range of from 0.1% to 20% by mass, but it can be determined in view of a desired color density and dispersibility of the colorant in the composition.

Alternatively, the active energy ray curable composition may include no colorant. In this case, the active energy ray curable composition is colorless and transparent, and therefore preferably applied to an overcoat layer for protecting an image.

Usable pigments include both inorganic pigments and organic pigments. Two or more of these pigments can be used in combination.

Specific examples of inorganic pigments include, but are not limited to, carbon blacks (i.e., C.I. Pigment Black 7) such as furnace black, lamp black, acetylene black, and channel black; iron oxides; and titanium oxides.

Specific examples of organic pigments include, but are not limited to, azo pigments (e.g., insoluble azo pigments, condensed azo pigments, azo lakes, chelate azo pigments), polycyclic pigments (e.g., phthalocyanine pigments, perylene pigments, perinone pigments, anthraquinone pigments, quinacridone pigments, dioxane pigments, thioindigo pigments, isoindolinone pigments, quinophthalone pigments), dye chelates (e.g., basic dye chelates, acid dye chelates), dye lakes (e.g., basic dye lakes, acid dye lakes), nitro pigments, nitroso pigments, aniline black, and daylight fluorescent pigments.

The active energy ray curable composition may further include a dispersant for improving dispersibility of the colorant.

Examples of the dispersant include, but are not limited to, polymeric dispersants commonly used for preparing pigment dispersions.

Usable dyes include acid dyes, direct dyes, reactive dyes, and basic dyes. Two or more of these dyes can be used in combination.

Organic Solvent

The active energy ray curable composition may include an organic solvent. However, it is more preferable that the active energy ray curable composition includes no organic solvent. When the active energy ray curable composition includes no organic solvent, in particular, when the composition is VOC (volatile organic compound) free, a higher degree of safety is provided at sites where the composition is being handled while environment pollution is prevented. Here, the organic solvent refers to a typical non-reactive organic solvent, such as ether, ketone, xylene, ethyl acetate, cyclohexanone, and toluene. The organic solvent is discriminated from a reactive monomer. When the composition is stated to include no organic solvent, it means that the composition "substantially" include no organic solvent. In this case, the content rate of the organic solvent in the composition is preferably less than 0.1% by mass.

Other Components

The active energy ray curable composition may further include other components, such as a surfactant, a polymerization inhibitor, a leveling agent, a defoamer, a fluorescence brightening agent, a permeation accelerator, a wetting agent (humectant), a fixing agent, a viscosity stabilizer, an anti-fungal agent, an antiseptic agent, an antioxidant, an ultraviolet absorber, a chelate agent, a pH adjuster, and a thickening agent.

Preparation of Active Energy Ray Curable Composition

The active energy ray curable composition may be prepared by: dispersing a polymerizable monomer, a pigment, a dispersant, etc., by a disperser (e.g., ball mill, disc mill, pin mill, DYNO-MILL) to prepare a pigment dispersion liquid; and further mixing a polymerizable monomer, a polymerization initiator, a polymerization inhibitor, a surfactant, etc., in the pigment dispersion liquid. The preparation method is not limited thereto.

Viscosity

The viscosity of the active energy ray curable composition is adjusted in accordance with the purpose of use or application. When the active energy ray curable composition is applied to a discharge device that discharges the composition from nozzles, the viscosity of the composition is preferably adjusted to from 3 to 40 mPa·s, more preferably from 5 to 15 mPa·s, and most preferably from 6 to 12 mPa·s, at a temperature of from 20° C. to 65° C., more preferably at 25° C. Preferably, the active energy ray curable composition exhibits a viscosity within the above-described range without including any organic solvent. The viscosity can be measured with a cone-plate rotary viscometer (VISCOMETER TVE-22L available from Toki Sangyo Co., Ltd.) using a cone rotor (1°34'×R24) while setting the revolution to 50 rpm and the temperature of the constant-temperature circulating water to from 20° C. to 65° C. The temperature of the circulating water can be adjusted by an instrument VISCOMATE VM-150III.

Use Application

The active energy ray curable composition can be applied to, for example, modeling resins, paints, adhesives, insulating materials, release agents, coating materials, sealing materials, resists, and optical materials.

Figure 1:
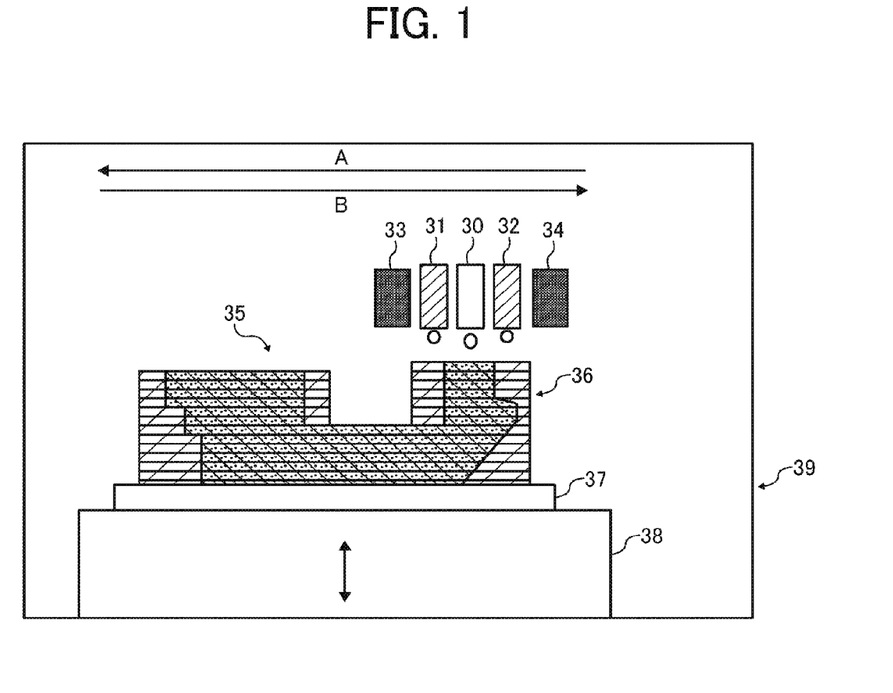
FIG. 1 is a schematic view of an image forming apparatus according to an embodiment of the present invention.
Figure 2A:
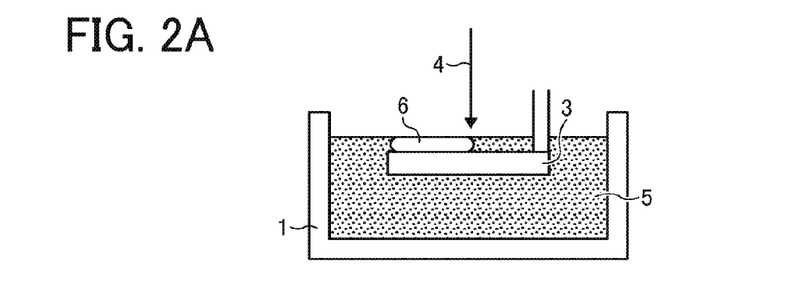
FIGS. 2A to 2D are schematic views of an image forming apparatus according to an embodiment of the present invention.
Figure 2B:
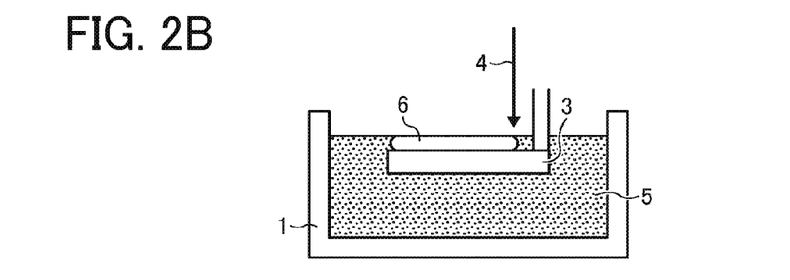
Figure 2C:
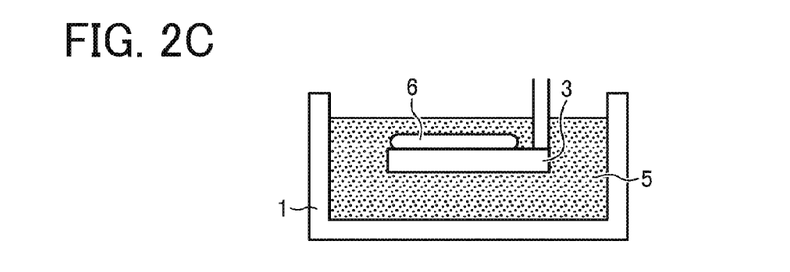
Figure 2D:
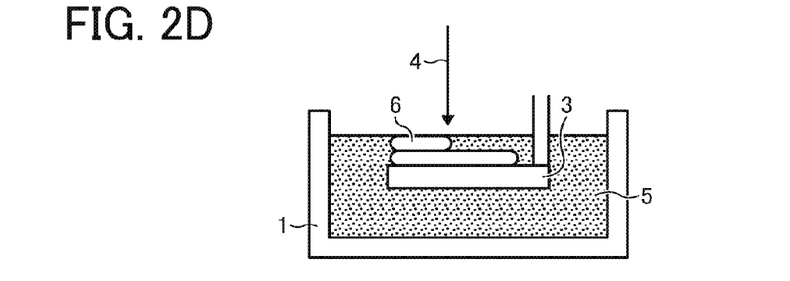

For example, the active energy ray curable composition can be applied to inks for forming two-dimensional texts and images and design coatings on various substrates. As another example, the active energy ray curable composition can be applied to materials for forming three-dimensional images (i.e., three-dimensional objects). The materials for forming three-dimensional objects can be used as a binder for binding powder particles in additive manufacturing that forms a three-dimensional object by repeatedly hardening and laminating powder layers. The materials for forming three-dimensional objects can also be used as a model material and a support material for use in stereolithography (one specific example of additive manufacturing) as illustrated in FIG. 1 and FIGS. 2A to 2D. FIG. 1 is an illustration of a method in which the active energy ray curable composition according to an embodiment of the present invention is discharged to a certain region and exposed to an active energy ray to cure, and the cured layers are sequentially laminated to form a three-dimensional object. Details of this method is described later. FIGS. 2A to 2D are illustrations of another method in which an active energy ray curable composition 5 according to an embodiment of the present invention is retained in a pool 1 and exposed to an active energy ray 4 to be formed into a cured layer 6 on a movable stage 3, and the cured layers 6 are sequentially laminated to form a three-dimensional object.

The active energy ray curable composition according to an embodiment of the present invention can be used for three-dimensional object forming apparatuses that may include a container for containing the active energy ray curable composition, a supplier, a discharger, and an active energy ray emitter.

The active energy ray curable composition according to an embodiment of the present invention may be caused to cure to become a cured product. The cured product may be formed on a substrate to form a structural body with the substrate. The structural body may be processed into a processed product. The processed product may be produced by subjecting a sheet-like or film-like cured product or structural body to a modeling processing such as stretching processing (optionally with heat) and punching processing. The processed product is preferably used for meters and operation panels of automobiles, office automation equipments, electric or electronic devices, and cameras, which typically need to be surface-decorated.

Specific examples of the substrate include, but are not limited to, paper, thread, fiber, fabric, leather, metal, plastic, glass, wood, ceramic, and composite materials thereof. Among these materials, plastic substrates are preferable from the aspect of processability.

Composition Storage Container

The composition storage container according to an embodiment of the present invention includes a container and the above-described active energy ray curable composition contained in the container. When the active energy ray curable composition is used as an ink, the active energy ray curable composition container serves as an ink cartridge or an ink bottle that prevents user from directly contacting the ink when the user is replacing the ink, thus preventing user's fingers and clothes from being contaminated with the ink. In addition, the ink cartridge or ink bottle prevents foreign substances from being mixed into the ink. The container is not limited in shape, size, and material. Preferably, the container is made of a light-blocking material or covered with a light-blocking sheet.

Image Forming Method and Image Forming Apparatus

The two-dimensional or three-dimensional image forming method according to an embodiment of the present invention includes at least the process of emitting an active energy ray to the active energy ray curable composition to cause the active energy ray curable composition to cure. The two-dimensional or three-dimensional image forming apparatus according to an embodiment of the present invention includes at least an emitter to emit an active energy ray to the active energy ray curable composition and a storage to store the active energy ray curable composition. The storage may include the above-described composition storage container. The two-dimensional or three-dimensional image forming method may further include the process of discharging the active energy ray curable composition. The two-dimensional or three-dimensional image forming apparatus may further include a discharger to discharge the active energy ray curable composition. The discharging method may be of a continuous injection type or an on-demand type, but is not limited thereto. Specific examples of the on-demand-type discharging method include thermal methods and electrostatic methods.

Figure 3:
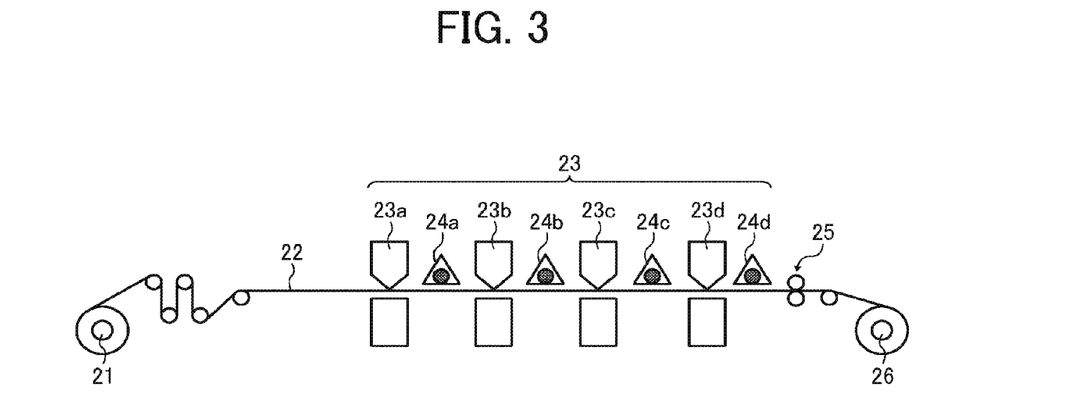
FIG. 3 is a schematic view of an image forming apparatus according to an embodiment of the present invention.

FIG. 3 is a schematic view of an image forming apparatus according to an embodiment of the present invention that includes an inkjet discharger. The image forming apparatus illustrated in FIG. 3 includes printing units 23a, 23b, 23c, and 23d and a supply roller 21. Each of the printing units 23a, 23b, 23c, and 23d includes an ink cartridge containing an active energy ray curable ink having yellow, magenta, cyan, and black colors, respectively, and a discharge head. The inks are discharged to a recording medium 22 supplied by the supply roller 21. Light sources 24a, 24b, 24c, and 24d emit active energy rays to the respective inks on the recording medium 22 to cause the inks to cure and form color images. The recording medium 22 is then conveyed to a winding roller 26 via a processing unit 25. Each of the printing units 23a, 23b, 23c, and 23d may be equipped with a heater for liquefying the ink at an ink discharging part. Furthermore, the printing units 23a, 23b, 23c, and 23d may be equipped with a cooler for cooling the recording medium to room temperature with or without contacting the recording medium. The image forming apparatus illustrated in FIG. 3 may be an inkjet recording apparatus employing either a serial method or a line method. In the serial method, ink is discharged from a moving discharge head onto a recording medium that is intermittently moved in accordance with the width of the discharge head. In the line method, ink is discharged from a fixed discharge head onto a recording medium that is continuously moved.

Specific preferred materials for the recording medium 22 include, but are not limited to, paper, film, metal, and composite materials thereof, which may be in the form of a sheet. The image forming apparatus illustrated in FIG. 3 may be capable of either one-side printing or duplex printing.

Active energy rays emitted from the light sources 24a, 24b, and 24c may be weakened or eliminated, and after multiple color images have been printed, an active energy ray may be emitted from the light source 24d. In this case, energy consumption and cost are reduced.

Recorded matters recorded by the ink according to an embodiment of the present invention include those printed on smooth surfaces such as normal paper and resin films, those printed on irregular surfaces, and those printed on surfaces of various materials such as metal and ceramics. By laminating two-dimensional images, a partially-three-dimensional image (including two-dimensional parts and three-dimensional parts) or a three-dimensional object can be obtained.

FIG. 1 is a schematic view of a three-dimensional image forming apparatus according to an embodiment of the present invention, as described above. Referring to FIG. 1, an image forming apparatus 39 includes a discharge head unit 30 for forming object layers, discharge head units 31 and 32 for forming support layers, and ultraviolet emitters 33 and 34 disposed adjacent to the discharge head units 30, 31, and 32. Each of the discharge head units 30, 31, and 32 includes an inkjet head and is movable in the directions indicated by arrows A and B in FIG. 1. The discharge head unit 30 discharges a first active energy ray curable composition, and the discharge head units 31 and 32 each discharge a second active energy ray curable composition different from the first active energy ray curable composition. The ultraviolet emitters 33 and 34 cause the active energy ray curable compositions to cure. The cured products are laminated in the image forming apparatus 39. More specifically, first, the second active energy ray curable composition is discharged from the discharge head units 31 and 32 onto an object supporting substrate 37 and exposed to an active energy ray to cure, thus becoming a first support layer having a reservoir. Next, the first active energy ray curable composition is discharged from the discharge head unit 30 onto the reservoir and exposed to an active energy ray to cure, thus becoming a first object layer. These processes are repeated multiple times, in accordance with the set number of lamination, while lowering a stage 38 that is movable in the vertical direction, to laminate the support layers and the object layers. Thus, a three-dimensional object 35 is obtained. A support layer lamination 36 is removed thereafter, if necessary. In the embodiment illustrated in FIG. 1, the number of discharge head unit 30 for forming object layers is one. Alternatively, the number thereof may be two or more.

EXAMPLES

Having generally described this invention, further understanding can be obtained by reference to certain specific examples which are provided herein for the purpose of illustration only and are not intended to be limiting.

Details of compounds used in Examples and Comparative Examples are listed in Table 1.

Skin sensitization information described in Table 1 was obtained from SDSs available in Japan or other countries. SI (determined by LLNA) values described in Table 1 were measured according to a method described in JP-2012-140593-A.

TABLE 1

| | | | Compound Names (with Product Names and Manufacturers) | Skin Sensitization Potential | Data Source |
|---|---|---|---|---|---|
| Polymerizable Monomer (A) | Monofunctional | (A-1) | Acryloylmorpholine (ACMO available from KJ Chemicals Corporation) | Negative | SDS |
| | | (A-2) | N-(2-Hydroxyethyl)acrylamide (HEAA available from KJ Chemicals Corporation) | Negative | SDS |
| | Polyfunctional | (A-3) | Caprolactone-modified dipentaerythritol hexaacrylate (Hexafunctional) (KAYARAD DPCA-60 available from Nippon Kayaku Co., Ltd.) | Negative | SDS |
| | | (A-4) | Tricyclodecane dimethanol dimethacrylate (Difunctional) (NK ESTER DCP available from Shin Nakamura Chemical Co., Ltd.) | Negative | SI = 1.3 (by LLNA) |
| | | (A-5) | Neopentyl glycol dimethacrylate (Difunctional) (NK ESTER NPG available from Shin Nakamura Chemical Co., Ltd.) | Negative | SI = 2.0 (by LLNA) |
| Polymerization Initiator (B1) | (B1-1) | | Diphenyl(2,4,6-trimethylbenzoyl)phosphine oxide (IRGACURE TPO available from BASF Japan Ltd) | Sub-category 1B | SDS |
| | (B1-2) | | Phenylbis(2,4,6-trimethylbenzoyl)phosphine oxide (IRGACURE 819 available from BASF Japan Ltd.) | Category 1 | SDS |
| | (B1-3) | | 1-[4-(Phenylthio)phenyl]octane-1,2-dione 2-(o-benzoyloxime) (IRGACURE OXE01 available from BASF Japan Ltd.) | Category 1 | SDS |
| | (B1-4) | | 1-[9-Ethyl-6-(2-methylbenzoyl)-9H-carbazole-3-yl]ethanone o-acetyloxime (IRGACURE OXE02 available from BASF Japan Ltd.) | Sub-category 1B | SDS |
| Polymerization Initiator (B2) | (B2-1) | | 2-Methyl-1-[4-(methylthio)phenyl]-2-morpholinopropane-1-one (IRGACURE 907 available from BASF Japan Ltd.) | Negative | SDS |
| | (B2-2) | | 2-(Dimethylamino)-2-[(4-methylphenyl)methyl]-1-(4-morpholinophenyl)butane-1-one (IRGACURE 379 available from BASF Japan Ltd.) | Negative | SDS |
| | (B2-3) | | 1-Hydroxycyclohexyl phenyl ketone (IRGACURE 184 available from BASF Japan Ltd.) | Negative | SDS |
| | (B2-4) | | 1-[4-(2-hydroxyethoxy)phenyl]-2-hydroxy-2-methylpropane-1-one (IRGACURE 2959 available from BASF Japan Ltd.) | Negative | SDS |
| Surfactant | | | Silicone surfactant (BYK-UV3510 available from BYK Japan KK) | Unknown | N/A |

Example 1

Preparation of Active Energy Ray Curable Composition 1

Acryloylmorpholine (ACMO available from KJ Chemicals Corporation) in an amount of 99.1% by mass and diphenyl(2,4,6-trimethylbenzoyl)phosphine oxide (IRGACURE TPO available from BASF Japan Ltd.) in an amount of 0.9% by mass were stirred for 1 hour, and after it was confirmed that nothing had been remaining without being dissolved, coarse particles were removed from the mixture by membrane filtering. Thus, an active energy ray curable composition 1 was prepared.

Examples 2-8 and Comparative Examples 1-3

Preparation of Active Energy Ray Curable Compositions 2-11

The procedure in Example 1 was repeated except for changing the composition to those described in Table 2. Thus, active energy ray curable compositions 2-11 were prepared.
Evaluation of Active Energy Ray Curable Compositions 1-11

A light exposure dose required for curing each of the active energy ray curable compositions 1-11 was measured using a rheometer (MCR 302 available from Anton Paar Japan K.K.) as follows. A plate-like circular jig having a diameter of 20 mm was set above a glass stage with a gap of 10 μm therebetween. Each active energy ray curable composition was filled in the gap and formed into a liquid film having a thickness of 10 μm. The liquid film was exposed to light having a wavelength of 365 nm emitted from an LED light source (LIGHTNINGCURE LC-L1 available from Hamamatsu Photonics K.K.) from below the glass stage, at an illuminance of 10 mW/cm$^2$ (when measured by an ultraviolet irradiance meter (UIT-201 available from Ushio Inc.) from above the glass stage). During the light exposure, a fluctuation in storage elastic modulus of the active energy ray curable composition was monitored by the rheometer in a vibration mode, to determine a curing time (sec) from when light exposure was started till the storage elastic modulus stopped rising and reached a saturation value. The light exposure dose (mJ/cm$^2$) required for curing the active energy ray curable composition was determined from the product of the illuminance and the curing time measured above.

After the above measurement, the liquid film of the active energy ray curable composition had been turned into a transparent cured film. The glass stage and the jig had been strongly bonded to each other via the cured film.

The saturation values of storage elastic modulus (Pa) were described in Table 2. The storage elastic modulus of the liquid film before being exposed to light was in the range of from $10^0$ to $10^1$ Pa.

TABLE 2

|  |  |  | Examples |  |  |  |  |  |  |  |
|---|---|---|---|---|---|---|---|---|---|---|
|  |  |  | 1 | 2 | 3 | 4 | 5 | 6 | 7 | 8 |
| Active Energy Ray Curable Composition No. |  |  | 1 | 2 | 3 | 4 | 5 | 6 | 7 | 8 |
| Polymerizable Monomer | (A-1) |  | 99.1 | 99.1 | 99.1 | 99.1 | 99.9 | 99.9 | 99.9 | 99.9 |
| Polymerization Initiator | (B1) | (B1-1) | 0.9 |  |  |  | 0.1 |  |  |  |
|  |  | (B1-2) |  | 0.9 |  |  |  | 0.1 |  |  |
|  |  | (B1-3) |  |  | 0.9 |  |  |  | 0.1 |  |
|  |  | (B1-4) |  |  |  | 0.9 |  |  |  | 0.1 |
|  | (B2) | (B2-1) |  |  |  |  |  |  |  |  |
|  | Total (% by mass) |  | 100.0 | 100.0 | 100.0 | 100.0 | 100.0 | 100.0 | 100.0 | 100.0 |
| Evaluation of Curability | Light Exposure Dose Required for Curing (mJ/cm$^2$) |  | 20 | 16 | 36 | 26 | 48 | 36 | 82 | 54 |
|  | Saturation Value of Storage Elastic Modulus (Pa) |  | $4 \times 10^5$ | $3 \times 10^5$ | $3 \times 10^5$ | $3 \times 10^5$ | $3 \times 10^5$ | $3 \times 10^5$ | $3 \times 10^5$ | $3 \times 10^5$ |

|  |  |  | Comparative Examples |  |  |
|---|---|---|---|---|---|
|  |  |  | 1 | 2 | 3 |
| Active Energy Ray Curable Composition No. |  |  | 9 | 10 | 11 |
| Polymerizable Monomer | (A-1) |  | 99.1 | 99.9 | 99.99 |
| Polymerization Initiator | (B1) | (B1-1) |  |  | 0.01 |
|  |  | (B1-2) |  |  |  |
|  |  | (B1-3) |  |  |  |
|  |  | (B1-4) |  |  |  |
|  | (B2) | (B2-1) | 0.9 | 0.1 |  |
|  | Total (% by mass) |  | 100.0 | 100.0 | 100.0 |
| Evaluation of Curability | Light Exposure Dose Required for Curing (mJ/cm$^2$) |  | 56 | 200 | Storage Elastic Modulus Did Not Increase at 500 (mJ/cm$^2$) |
|  | Saturation Value of Storage Elastic Modulus (Pa) |  | $2 \times 10^5$ | $2 \times 10^5$ |  |

Referring to Table 2, when comparing Examples 1-4 and Comparative Example 1, all of which being equal in the amount of polymerization initiator, the light exposure dose required for curing is much smaller in Examples 1-4 than Comparative Example 1, which means that Examples 1-4 have advantage in curability than Comparative Example 1. The same goes for the comparison of Examples 5-8 with Comparative Example 2. When comparing Examples 5, 6, and 8 and Comparative Example 1, Examples 5, 6, and 8 have advantage in curability than Comparative Example 1 although the amount of polymerization initiator is one-ninth of that of Comparative Example 1. With respect to the saturation value of storage elastic modulus, Examples 1-8 are higher than Comparative Examples 1-2, which indicates the cured products in Examples 1-8 have a higher degree of hardness than those in Comparative Examples 1-2.

Examples 9-13

In Examples 1-8, the active energy ray compositions were subjected to a measurement of viscoelasticity to evaluate curability. In Examples 9-13, the active energy ray composition were each discharged onto a substrate by means of inkjet and exposed to ultraviolet ray to cure, thus becoming an image. The image was subjected to evaluation of image quality and adhesion between the image and the substrate.
Preparation of Active Energy Ray Curable Compositions 12-16

The procedure in Example 1 was repeated except for changing the composition to those described in Table 3. Thus, active energy ray curable compositions 12-16 were prepared.
Inkjet Image Formation with Active Energy Ray Curable Compositions 12-16

Each of the active energy ray curable compositions 12-16 was filled in a composition storage container made of plastic. The composition storage container was installed in an image forming apparatus including an inkjet head (MH5440 available from Ricoh Co., Ltd.) serving as a discharger, an ultraviolet emitter (LH6 available from Fusion Systems Japan) serving as an active energy ray emitter, a controller for controlling discharging operations, and a supply path extending from the composition storage container to the inkjet head. The active energy ray curable composition was discharged from the inkjet head onto a film thickness of 40 μm and thereafter irradiated with ultraviolet light at an illuminance of 500 mJ/cm$^2$. Thus, an image was formed.

Evaluation Results are Shown in Table 3.

Referring to Table 3, all the images produced with the active energy ray curable compositions 12-16 by means of inkjet recording have good quality. Examples 9-13 provide images with transparency and glossiness without any defect caused by defective ink discharge or defective curing.

Adhesion between each image and the substrate was measured by the cross-cut method according to JIS (Japanese Industrial Standards) K5600-5-6:1999 (the Japanese-language translation of ISO 2409:1992, Paints and varnishes-Cross-cut test, the disclosure thereof being incorporated herein by reference). Referring to Table 3, all the images produced with the active energy ray curable compositions 12-16 provide improved adhesion to the substrate. In the cross-cut test for Examples 9-13, the edges of the cuts were completely smooth, and none of the squares of the lattice was detached.

TABLE 3

| | | Examples | | | | |
|---|---|---|---|---|---|---|
| | | 9 | 10 | 11 | 12 | 13 |
| Active Energy Ray Curable Composition No. | | 12 | 13 | 14 | 15 | 16 |
| Polymerizable Monomer (A) | (A-1) | | 9.4 | 78.4 | 54.4 | 79.1 |
| | (A-2) | 9.4 | | 20.0 | 30.0 | |
| | (A-3) | 30.0 | 20.0 | | | 10.0 |
| | (A-4) | 20.0 | | | 10.0 | |
| | (A-5) | 30.0 | 50.0 | | | 10.0 |
| Polymerization Initiator (B1) | (B1-1) | 0.5 | | | | 0.2 |
| | (B1-2) | | 0.5 | | | 0.2 |
| | (B1-3) | | | 0.5 | | 0.2 |
| | (B1-4) | | | | 0.5 | 0.2 |
| (B2) | (B2-1) | 10.0 | | | | |
| | (B2-2) | | | 1.0 | | |
| | (B2-3) | | 20.0 | | | |
| | (B2-4) | | | | 5.0 | |
| Surfactant | | 0.1 | 0.1 | 0.1 | 0.1 | 0.1 |
| Total (% by mass) | | 100.0 | 100.0 | 100.0 | 100.0 | 100.0 |
| Inkjet Image Quality | | Good | Good | Good | Good | Good |
| Adhesion of Image | | Good | Good | Good | Good | Good |

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. An active energy ray curable composition comprising:
   a polymerizable monomer (A); and
   a polymerization initiator (B) including a skin-sensitizing polymerization initiator (B1) in an amount less than 1.0% by mass but not less than 0.1% by mass of the active energy ray curable composition,
   wherein 99.0% by mass or more of the active energy ray curable composition consists of non-skin-sensitizing constituents.

2. The active energy ray curable composition of claim 1, wherein the polymerization initiator (B) further includes a non-skin-sensitizing polymerization initiator (B2) in an amount of from 1.0% to 20.0% by mass of the active energy ray curable composition.

3. The active energy ray curable composition of claim 1, wherein the skin-sensitizing polymerization initiator (B1) includes at least one member selected from the group consisting of acylphosphine oxide compounds and oxime ester compounds.

4. The active energy ray curable composition of claim 2, wherein the non-skin-sensitizing polymerization initiator (B2) includes at least one member selected from the group consisting of α-aminoketone compounds and α-hydroxyketone compounds.

5. The active energy ray curable composition of claim 1, wherein the polymerizable monomer (A) includes a non-skin-sensitizing monofunctional acrylamide compound.

6. A cured product produced by a method comprising:
   causing the active energy ray curable composition of claim 1 to cure.

7. A composition storage container comprising:
a container; and
the active energy ray curable composition of claim 1 contained in the container.

8. A two-dimensional or three-dimensional image forming apparatus comprising:
the composition storage container of claim 7;
a discharger to discharge the active energy ray curable composition contained in the container; and
an emitter to emit an active energy ray to the discharged active energy ray curable composition.

9. A two-dimensional or three-dimensional image forming method comprising:
discharging the active energy ray composition of claim 1; and
emitting an active energy ray to the discharged active energy ray composition.

* * * * *